United States Patent [19]

Kraus

[11] Patent Number: 4,660,995
[45] Date of Patent: Apr. 28, 1987

[54] HYDROSTATIC AXIAL THRUST BEARING STRUCTURE

[75] Inventor: Charles E. Kraus, Austin, Tex.

[73] Assignee: Excelermatic Inc., Austin, Tex.

[21] Appl. No.: 901,408

[22] Filed: Aug. 28, 1986

[51] Int. Cl.$^4$ .................. F16C 32/06; F16C 33/74; F16H 15/08; F16J 15/00

[52] U.S. Cl. .................. 384/121; 74/200; 277/9; 277/228; 384/124; 384/125; 384/130

[58] Field of Search ............. 384/101, 102, 107–113, 384/121–125, 130, 131, 138, 144, 151–153, 368, 420, 455, 477, 480, 488, 489, 607; 277/228, 226, 9; 74/200

[56] References Cited

U.S. PATENT DOCUMENTS

| | | | |
|---|---|---|---|
| 2,635,931 | 4/1953 | May | 384/152 |
| 2,887,766 | 5/1959 | Fike et al. | 384/912 X |
| 2,996,320 | 8/1961 | Mason | 384/152 |
| 3,619,016 | 11/1971 | Kraus | 384/122 |
| 3,910,650 | 10/1975 | Kraus | 384/125 |
| 3,960,417 | 6/1976 | Kraus | 384/125 |
| 4,086,820 | 5/1978 | Kraus et al. | 74/200 |
| 4,306,754 | 12/1981 | Kraus | 384/121 |
| 4,484,487 | 11/1984 | Kraus | 74/200 |

*Primary Examiner*—Stuart S. Levy
*Assistant Examiner*—Thomas R. Hannon

[57] ABSTRACT

In a hydrostatic axial thrust bearing structure in which two bearing members are disposed for movement relative to one another, a central bearing cavity adapted to receive pressurized bearing fluid is surrounded by a limited leakage seal structure which includes a ring of an elastomeric material disposed in a recess in one of the bearing members and a seal face formed on the other member which has a cylindrical outer surface received in a cylindrical projection of the one bearing member with a small axial leakage gap provided between the cylindrical surfaces of the two bearing members thereby providing a leakage path from the bearing cavity which is independent of the movement of the two bearing members relative to one another.

7 Claims, 3 Drawing Figures

HYDROSTATIC AXIAL THRUST BEARING STRUCTURE

BACKGROUND OF THE INVENTION

The invention relates to hydrostatic axial thrust bearings especially high speed, high pressure hydrostatic bearings.

Hydrostatic axial thrust bearings can carry relatively large loads, are relatively inexpensive and are quite efficient. They are also accurate in positioning two relatively movable structures if the hydraulic bearing pad between the two relatively movable bearing structures is thin or a bearing cavity seal is closely adjacent the structure to be sealed. A major problem, however, resides in wear and scratching of the harder element of the seal or other mating structural areas. It appears that hard abrasive particles are implanted into the softer of the two mating surface areas and, embedded therein, they lap and grind down the harder of the two surfaces. Even very fine filters such as 10 micron lubricant filters have been found to be ineffective in preventing surface scratching and wear.

Resilient bearing surfaces have been proposed (U.S. Pat. No. 2,887,766) and have been found to be effective to some degree but highly resilient surfaces have been subject to wear particularly on the radially outer edges of the bearing seal surfaces.

It has been found that the wear at the outer edges of the bearing seal faces results actually from a deformation of the resilient surfaces caused by the pressure of the lubricant flowing through the gap between the seal surfaces. It was found that this pressure causes the outer edges to grow out of the plane of the seal faces and finally into contact with the opposite seal face resulting in wear and even melting of the outer edges of the seal faces.

SUMMARY OF THE INVENTION

The present invention overcomes this problem by providing seal faces with curved raised radial center sections such that depression of the center sections at most will flatten the seal surfaces.

It was also found to be important that the flow of lubricant out of the hydraulic bearing cavity is limited and is not substantially affected by lift-off of the two bearing parts, that is, by an increase or decrease of the gap between the seal surfaces. The bearing cavity therefore has an axial outer cylindrical wall in which the supported or supporting circular body is piston-like received with only a small clearance between the cylindrical bearing housing wall and the piston-like bearing member such that relatively axial movement of the bearing members will not change the size of the flow limiting gap between them. The gap is small enough to prevent the resilient seal from being extruded into the gap under high temperature, high pressure conditions. Preferably the curved raised radial bearing surface of the body of resilient material is formed by an O-ring received in a cavity in which the O-ring is held either mechanically by a hold-down member or hydraulically by providing drain passages in the area of the cavity base below the O-ring such that a low pressure is maintained between the O-ring and the cavity base.

DESCRIPTION OF THE PREFERRED EMBODIMENT

Figure 1:
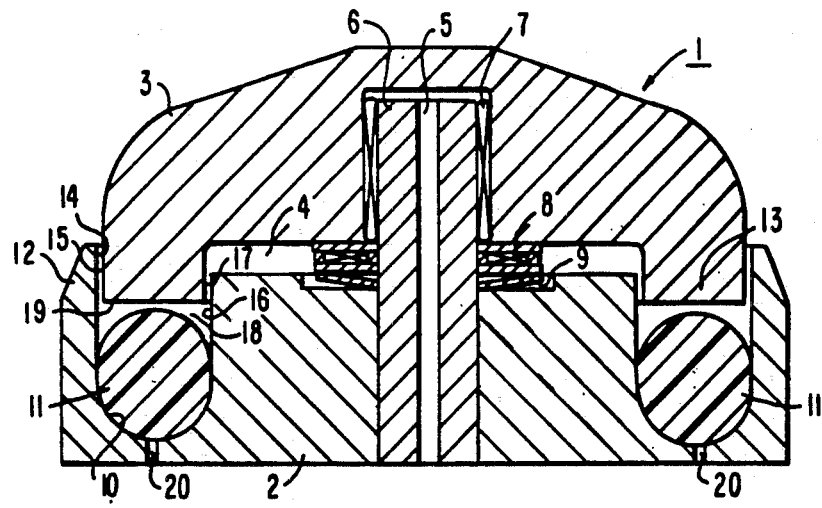
FIG. 1 is a cross-sectional view of an axial thrust bearing according to the invention utilizing an O-ring of circular cross-section squeeze-fitted into a ring cavity in one of the bearing members.

As shown in FIG. 1, a hydrostatic axial thrust bearing structure 1 comprises a support body 2 having a runner 3 disposed thereon which runner 3 as shown in all Figures is, for example, the traction roller of a traction roller transmission of the type shown in applicant's U.S. Pat. No. 4,086,820. The runner 3 is provided with a hydrostatic bearing cavity 4 to which pressurized fluid is supplied by means of a pressurized fluid supply passage 5 which extends through a shaft 6 providing radial support for the runner 3 by a needle bearing 7. Limited axial support is provided for the runner 3 by an antifriction bearing 8 supported on a Belleville spring 9 in order to prevent damage to the bearing during idle operation without lubricant or insufficiently pressurized lubricant in the cavity 4.

As shown in the Figures, the support body 2 is provided with an annular cavity 10 of a size so as to snugly receive an O-ring 11. The annular cavity 10 is surrounded by a cylindrical wall section 12 projecting outwardly and receiving therein the cylindrical piston-like skirt area 13 of the runner 3 which is sized so as to tightly fit into the wall section 12 with a clearance between the inner surface 14 of the wall section 12 and the outer surface 15 of the skirt area 13. The clearance is dependent on the size of the bearing structure and the O-ring and also the O-ring material as specified by the O-ring manufacturer and which is generally about 2-3 thousands of an inch. The gap shown in FIG. 1 between the inner axial wall surface 16 of the cavity 10 and the inner surface 17 of the skirt area 13 is not so critical, in fact, principally there is no need for such gap but applicant has found that a narrow axial passage as shown between the surfaces 16 and 17 aids in retaining the O-ring 11 seated in the groove 10 since there is no straight fluid flow into the seal leakage path 18 between the O-ring 11 and the seal face 19 of the runner 3 which is preferably a smooth hard metal surface. In order to permit the O-ring 11 to be seated on the bottom of the annular cavity 10 there is provided a vent passage 20 which facilitates mounting of the O-ring and also releases pressurized fluid from below the O-ring so as to retain the seal ring firmly in proper position in the cavity 10 during operation of the bearing.

The O-ring preferably consists of a fluorocarbon such as Viton. For clarity of representation the O-rings in the Figures are greatly enlarged. The actual size used in connection with a traction roller transmission's traction roller hydrostatic bearing is for example 0.093 inch in material diameter.

With the arrangement as shown in FIG. 1 excellent test results have been achieved. During high pressure operation it has been found that the curved O-ring surface adjacent the seal face 19 of the skirt area 13 becomes somewhat flattened but is not extruded into the gaps between the cavity wall surfaces 14 and 16 and the skirt surfaces 15 and 17, respectively.

Figure 2:
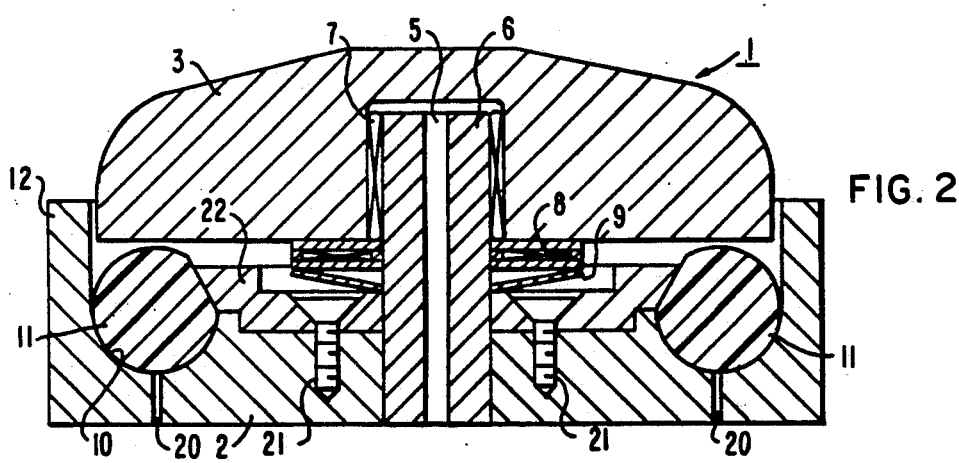
FIG. 2 is a cross-sectional view of an axial thrust bearing similar to that of FIG. 1 and including a hold-down disc.

FIG. 2 shows an arrangement similar to FIG. 1 and functionally equivalent members are therefore provided with the reference numerals as utilized in FIG. 1 so that they do not need to be described again. In the arrangement shown in FIG. 2 the O-ring is retained in the annular groove 10 mechanically by means of a clamping member 22 mounted on the support body 2 by hold-down screws 21.

Figure 3:
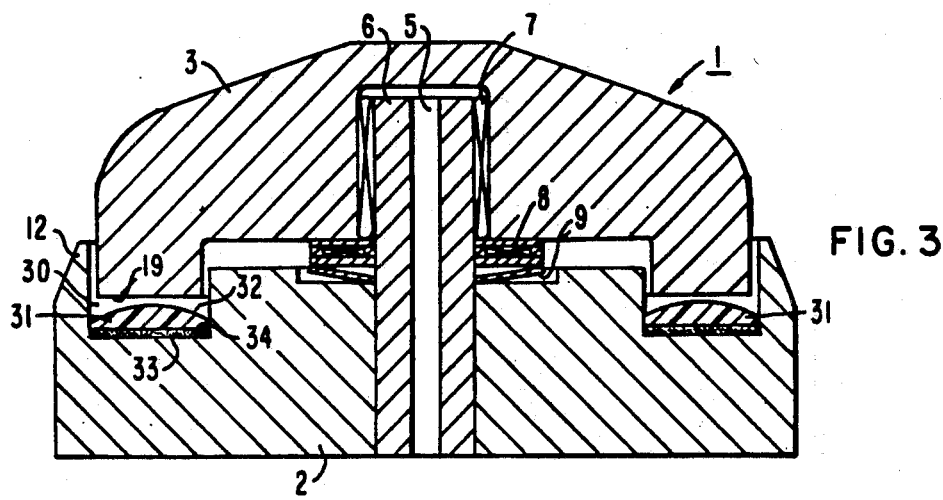
FIG. 3 is a cross-sectional view of an axial thrust bearing with an elastomeric seal member with a face area shaped in accordance with the invention.

FIG. 3 also shows an arrangement similar to FIG. 1 wherein however in place of an O-ring there is disposed in the annular groove 30 a shaped elastomeric ring 31 provided with a curved top surface 32 adjacent the runner's seal face 19 but having a flat opposite face 33 with which the ring 31 is bonded to the flat base 34 of the annular groove 30.

What is claimed is:

1. A hydrostatic axial thrust bearing structure comprising two bearing members disposed so as to be movable relative to one another and having formed therebetween a bearing fluid cavity, means for supplying a fluid under pressure to said bearing cavity and a limited leakage seal structure formed between the two bearing members around said bearing fluid cavity, said limited leakage seal structure having an annular axial recess formed in one of said bearing members and including an axially projecting outer portion defining a cylindrical inner wall around said axial recess, a ring structure of an elastomeric material disposed in said recess, said ring structure having a raised axially projecting center portion, and the other of said bearing members having an outer cylindrical surface of a diameter slightly smaller than the inner diameter of the axially projecting outer portion of said one bearing member and being received piston-like within said axially projecting portion of said one bearing member, said other member having an annular seal face area disposed opposite the elastomeric ring structure of said one bearing member.

2. An axial thrust bearing structure according to claim 1, wherein said elastomeric ring structure is an O-ring disposed in said axial recess and said one member has vent openings below said O-ring to facilitate insertion of said O-ring into said recess and hydraulically retaining said O-ring in said recess.

3. An axial thrust bearing structure according to claim 2, wherein said O-ring is retained in said recess by a retaining ring mounted to said one bearing member and firmly engaging said O-ring.

4. An axial thrust bearing structure according to claim 1, wherein said elastomeric ring structure is an elastomeric ring having an axial bottom surface cemented into said recess and having an axial seal surface disposed adjacent the seal surface of said other member and shaped to form, in cross-section, a circle-section face area.

5. An axial thrust bearing structure according to claim 1, wherein said elastomeric ring structure consists of a fluorocarbon elastic material.

6. An axial thrust bearing structure according to claim 1, wherein the annular gap between the adjacent cylindrical surfaces of said one and other bearing members is about 2–3 thousands of an inch.

7. An axial thrust bearing structure according to claim 1, wherein said recess is bounded also by an inner axially extending cylindrical wall section so as to define a tubular cavity between said outer cylindrical wall and said inner cylindrical wall and said other bearing member has a skirt adapted to be received in said tubular recess with said seal face formed at the axial end face of said skirt.

* * * * *